United States Patent [19]

Hardwick

[11] Patent Number: 5,242,098

[45] Date of Patent: Sep. 7, 1993

[54] METHOD OF EXPLOSIVELY BONDING COMPOSITE METAL STRUCTURES

[75] Inventor: Roy Hardwick, Troon, Scotland

[73] Assignee: Imperial Chemical Industries PLC, England

[21] Appl. No.: 806,344

[22] Filed: Dec. 13, 1991

[30] Foreign Application Priority Data

Dec. 21, 1990 [GB] United Kingdom ............... 9027802

[51] Int. Cl.⁵ ............................................. B23K 20/08
[52] U.S. Cl. .................................. 228/107; 228/109; 228/118
[58] Field of Search ............... 228/107, 109, 108, 118, 228/2.5

[56] References Cited

U.S. PATENT DOCUMENTS

| | | | |
|---|---|---|---|
| 3,449,819 | 6/1969 | Blank | 228/107 |
| 3,940,049 | 2/1976 | Richter et al. | 228/107 |
| 4,361,262 | 11/1982 | Israeli | 228/118 |
| 4,549,685 | 10/1985 | Paez | 228/118 |

FOREIGN PATENT DOCUMENTS

| | | |
|---|---|---|
| 0350329 | 7/1989 | European Pat. Off. |
| 923746 | 4/1963 | United Kingdom . |
| 1130527 | 10/1968 | United Kingdom . |
| 1248794 | 10/1971 | United Kingdom . |
| 2209982 | 8/1988 | United Kingdom . |
| 2213754 | 11/1988 | United Kingdom . |

Primary Examiner—Kurt C. Rowan
Assistant Examiner—Jeffrey T. Knapp
Attorney, Agent, or Firm—Cushman, Darby & Cushman

[57] ABSTRACT

It is known to form a composite laminar metal structure, wherein two or more overlapping metal plates (11, 12, 21, 22, 23, 31, 32) are metallurgically bonded at their interfaces, impelling the plates (11, 12, 21, 22, 23, 31, 32) together by means of detonating an explosive charge (19), bonding of the plates (11, 12, 21, 22, 23, 31, 32) at selected areas (13) being prevented by covering the plates (11, 12, 21, 22, 23, 31, 32) at the selected ares (13) with a stopping-off material. The present invention improves this by providing metal sheet (14, 24, 34) which is placed in intimate contact with the stopping-off material, the metal sheet (14, 24, 34) being capable of metallurgically bonding to an adjacent metal plate (12, 21, 23, 32) at each selected area (13). The sheet (14, 24, 34) must be sufficiently thick to retain its' profile in the bonding process, and also sufficiently thin to leave an appropriate stand-off distance between itself and the opposing surface of the adjacent metal plate (12, 21, 23, 32) to ensure metallurgical bonding of the metal sheet (14, 24, 34) to the adjacent metal plate (12, 21, 23, 32).

8 Claims, 3 Drawing Sheets

METHOD OF EXPLOSIVELY BONDING COMPOSITE METAL STRUCTURES

This invention relates to a method of explosively bonding metal plates to form composite metal structures wherein the plates are bonded at selected areas only. The method is especially advantageous for the production of composite hollow structures which can be superplastically formed by introducing pressurised gas between the metal plates at non-bonded areas to expand and elongate the surrounding metal.

The explosive bonding of dissimilar plates to form composite plates has long been known and is widely practised in industry for the production of clad plates. The method has been described in GB Patent Specifications Nos. 923 746, 116 826, 1 213 754 and 1 248 794. The formation of explosively bonded, superplastically formed, hollow structures has been described in GB Patent Specification Nos. 2 213 754 and 2 209 982, and in EP Patent Publication No. 0 350 329 A. In the explosive bonding process the metal plates to be bonded are stacked one above the other with an appropriate spacing between the opposed faces of adjacent plates and impelled together by the force generated by the progressive detonation of an overlying layer of explosive material. When bonding is desired at selected areas only of the stacked plates a stopping-off material is positioned between adjacent plates where bonding is not desired. The stopping-off material is usually a non-metallic surface-contaminating composition applied to one or both metal plate surfaces at the interface where bonding is to be prevented. A typical contaminating agent is an inert ceramic material in a bonding agent which may be painted, sprayed or otherwise applied to a metal surface to define precisely shaped "non-bond" areas.

Such non-bonded areas can advantageously be provided in certain engineering structures to provide sites which can be continuously monitored in quality control tests. More usually, however, such structures are intended for making superplastically formed components, and contain enclosed non-bonded areas within a remaining bonded metal interface area into which pressurised gas can be introduced to deform the metal above and/or below these areas into a die. Such superplastically formed components may thus be provided with strengthening contours to give the high strength to weight ratio necessary for certain aerospace components.

When the metal plates are impelled together in the explosive bonding process the surfaces being bonded progressively meet at a collision front which traverses the interfacial area at high velocity. At the collision front, the metal at the two surfaces being bonded is removed to a depth governed by the collision pressure, to become consolidated in a single jet preceding the collision front, any contaminates originally on the metal surface also being removed into the jet. The newly formed surfaces under pressure behind the jet become bonded together by electron sharing between the adjacent atoms at the interface. Any contaminant or stopping-off composition deliberately placed on the metal surface will similarly be liable to be entrained in the jet. It is evident that bonding will only be effectively prevented if the contaminate layer is sufficiently thick to preclude its complete removal in the jet. Thus for successful non-bonding at pre-selected areas the stopping-off layer thickness and the collision pressure must be interrelated and both must be closely controlled.

Using the method of explosive bonding described in GB 2 213 754 A, wherein a heavy driver plate and a protective layer of granular inert material is interposed between the explosive layer and the metal plates to be bonded, structures have been successfully bonded with well defined non-bonded areas. We have found, however, that whilst precise definition of the non-bonded area is readily attainable with smaller sized plates, the definition of the non-bonded areas of larger plates deteriorates markedly with increasing distance from the explosive initiation point. The reasons for this deterioration are considered to be associated with the following factors:

1. Steady state conditions do not exist over the distance travelled by the collision front. The collision front will increase in radius as a function of distance from the initiation point. Consequently, the degree of tri-axial bending of the impelled component will reduce, resulting in increasing collision pressures (as evidenced by increase wave amplitude of the bond) which is a variable which must be controlled.

2. It has been determined that the jet velocity can be up to 2.5 times that of the collision front velocity. The front of the jet, therefore, becomes more remote from the collision front as a function of time and distance. This jet is at a high temperature which may affect the stopping-off contaminant if sufficient time exists for a reaction to occur. The required time may be available when the jet becomes sufficiently in advance of the collision front, i.e. after a certain distance from the initiation point.

3. The collision angle increases also as a function of distance. This, in turn, will affect the angle of the emerging jet at the collision front, thus affecting also the depth of scouring of the component surfaces which occurs ahead of the collision front and possibly resulting in the complete removal of the contaminant from parts of the metal surface at areas remote from the initiation point.

4. The area of desired non-bond may also be significant when considered in conjunction with the previous three factors. If a larger area of non-bond is required, the impelled plate may well be reflected back due to its inability to bond to the contaminated surface. This may impose excessive tensile stresses on the bond adjacent to the contaminated area. Thus the uncontaminated area is first bonded but is then disbonded by the tensile stresses imposed during the finite space of time when the two surfaces remain plastic and are being deformed.

We have now found that the definition of the non-bonded area can be markedly improved, even at areas on large metal plates remote from the initiation point, by covering the stop-off material with a contacting metal sheet or foil.

Accordingly, this invention provides a method of forming a composite laminar metal structure, wherein two or more overlapping metal plates are metallurgically bonded at their interfaces by impelling the plates together by means of the detonation of an explosive charge, bonding of the plates at one or more selected areas being prevented by covering each of the plates at the selected area or areas with a stopping-off material, in which method metal sheet is placed in intimate contact with the stopping-off material, said metal sheet being capable of metallurgically bonding to an adjacent metal plate at each selected area and being sufficiently thick to retain its profile in the bonding process and also sufficiently thin to leave appropriate stand-off distance between the metal sheet and opposing surface of the adjacent metal plate to ensure metallurgical bonding of the metal sheet to the adjacent metal plate.

The stopping-off material may advantageously be adhesive material which will positively locate the metal sheet in the desired position on the metal plate and fill the space therebetween.

In this case the metal sheet is preferably initially provided with a backing of adhesive material and may be in tape form.

The metal sheet should cover only those areas of the metal plate interface which are to remain unbonded and all air should be excluded from beneath the metal sheet.

Ideally the metal sheet should be of identical or similar metal to the adjacent metal plate with which it will bond in the bonding process.

During bonding the two plate surfaces of the interface are impelled together to become bonded in those areas not covered by the metal sheet or foil. In those areas covered by the metal sheet, an opposing surface portion of the adjacent metal plate becomes bonded to a facing surface of the metal sheet on contact. Because of the absence of a stand-off gap, the stopping-off material prevents bonding of the other surface of the metal sheet to the selected area of the plate.

The metal sheet is sufficiently thick that it does not break under the collision pressure in the bonding process and is effective to protect the stopping-off material from the scouring action of the jet so that the material in not eroded from the metal plate surface nor carried into the jet. The metal sheet is, further sufficiently thin so that its free surface is at an appropriate stand-off distance from the adjacent metal plate for bonding to the plate to occur. Thus, in the explosive bonding process, bonding of the uncontaminated plate to an opposed metal surface takes place in a continuous manner over the entire interface from the initiation point rather than being interrupted at contaminated areas which are to remain unbonded. There is, therefore, no reflection of the impelled plate from a contaminated area and consequently no stresses imposed upon the plates which could cause the plates to separate at newly bonded areas. Because of the absence of a stand-off grip there is no metallurgical bond formed.

Following bonding, the heat generated within the bonded composite from the kinetic energy released by the impacting of the now bonded components will result in at least partial decomposition of any adhesive stopping-off material. This, aided by any subsequent heat treatment, releases the metal sheet from the initially contaminated surface to generate a pre-defined, pre-dimensioned cavity into which pressurised gas can be induced by conventional measures to superplastically form the final composite component.

The invention is further illustrated by the following three examples, which are described with reference to the accompanying drawings, wherein.

EXAMPLE (1)

Figure 1:
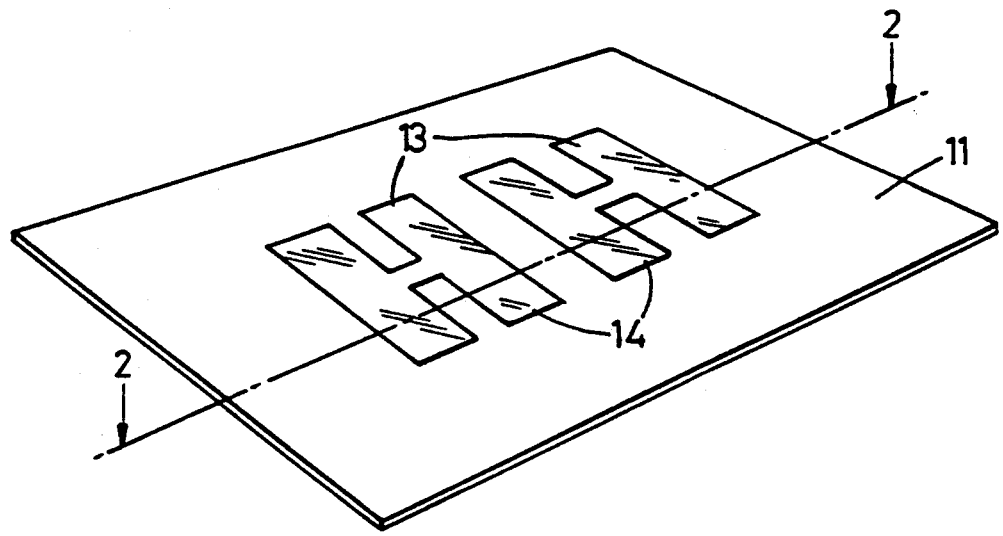
FIG. 1 is a perspective view of part of an assembly comprising a metal plate and metal foil covering for use in Example (1)
Figure 2:
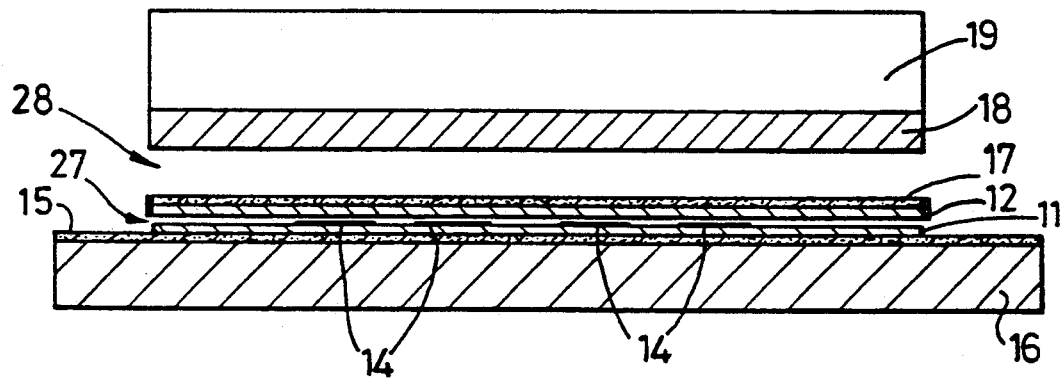
FIG. 2 is a section along the line 2—2 of the plate shown in FIG. 1, showing the complete assembly of Example (1) before an explosive bonding operation.
Figure 3:
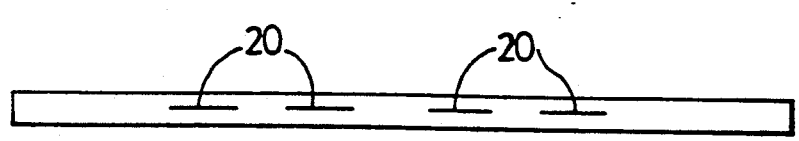
FIG. 3 is a section along the line 2—2 of the plate shown in FIG. 1, showing a bonded composite produced in Example (1)

Referring to FIGS. 1 to 3, two aluminium plates 11, 12, 1350 mm×980 mm×3 mm were prepared, the surfaces to be bonded being degreased and pickled to minimise surface contaminants. Two areas 13 were then pre-defined on an upper surface of one of the plates 11. Each of these areas 13 was in the shape of an "H", having vertical lines 370 mm in height and 100 mm in width, spaced 108 mm apart, and joined by a horizontal bar of the "H", this being 19 mm in width. These areas were covered using adhesive backed 0.063 mm thick aluminium foil 14 manufactured by 3M United Kingdom Plc and designated type 431. The foil 14 was rolled to exclude all air from the interface and ensure zero stand-off, i.e. intimate contact between a back surface of the foil 14 and the plate surface.

The second plate 12 was placed above the first with the prepared surface immediately above the "patterned" surface of the first plate 11 with a uniform gap 27 of 2 mm existing between the plates surfaces.

The assembled plates 11 and 12 were placed on a 10 mm thick bed 15 of granular salt (sodium chloride) situated on a 50 mm thick steel anvil 16. A 6 mm layer of salt 17 was placed on an upper surface of plate 11. A 12 mm thick steel plate 18 was placed above the salt layer 17 to leave a uniform gap 28 of 15 mm between the underside of the steel plate 18 and the surface of the salt layer 17.

An explosive charge 19 was placed over the upper surface of the steel plate 18 and detonated from the centre of the longer side to drive the upper plate 18 downwards in the manner described in GB Patent Specification No. 2 213 754 and bond plates 11 and 12. Ultrasonic examination confirmed a total bonding over the interfacial area of the plates 11, 12 except at areas 20 corresponding exactly to the areas beneath the aluminium foil 14 which did not bond to the lower plate 11 but were bonded to the upper plate 12. The non-bonded area 20 contained a cavity suitable for receiving high pressure gas in a subsequent superplastic forming process.

EXAMPLE (2)

Figure 4:
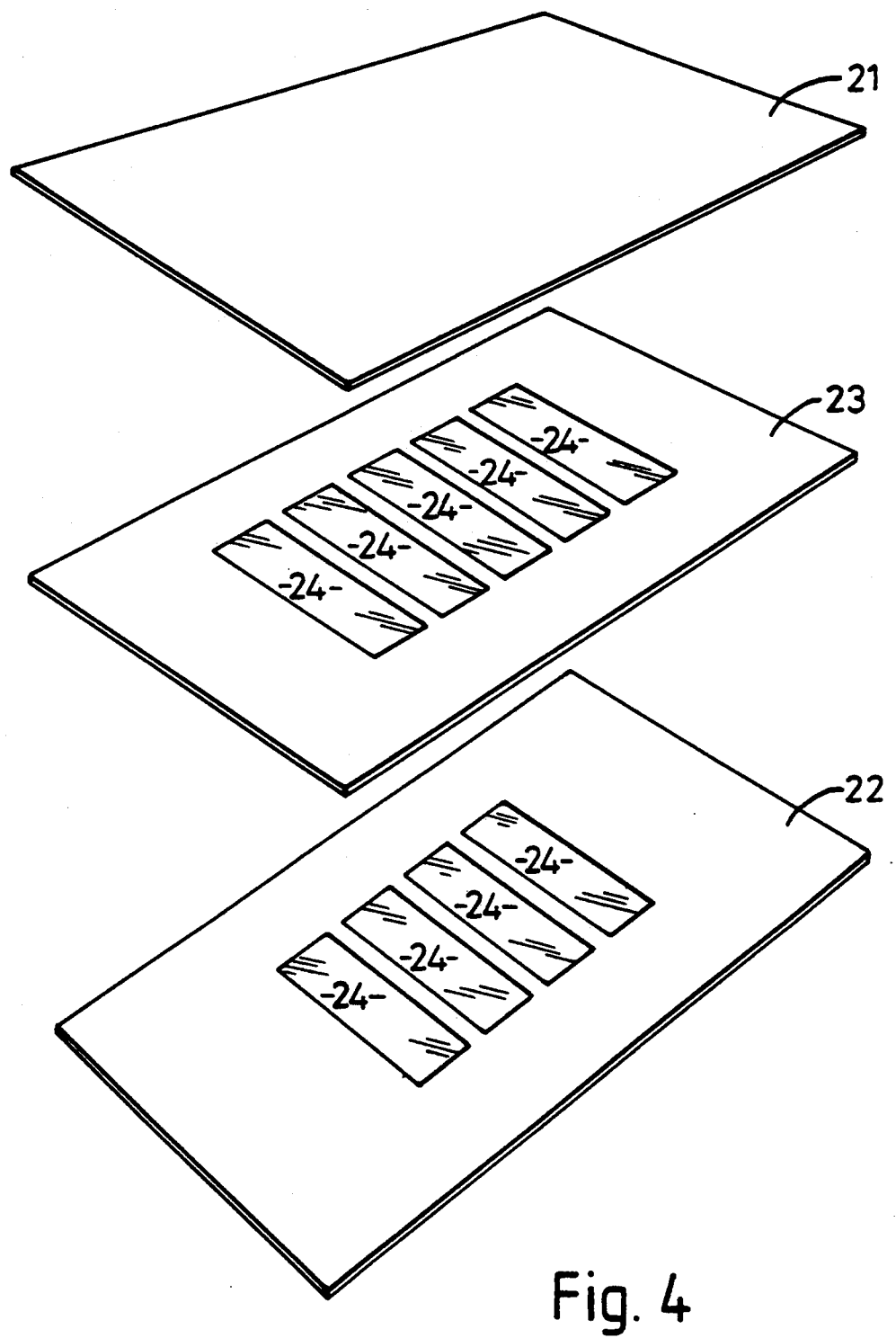
FIG. 4 is a perspective view of three plates to be bonded in Example (2)
Figure 5:
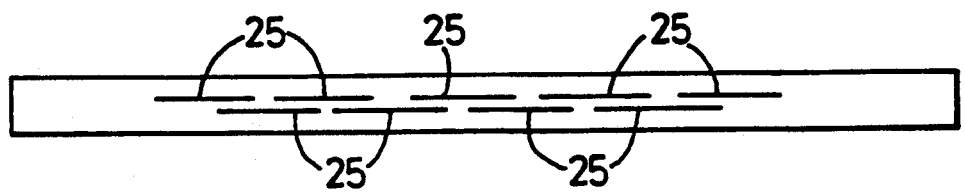
FIG. 5 is a medial section of a bonded composite produced in Example (2)
Figure 6:
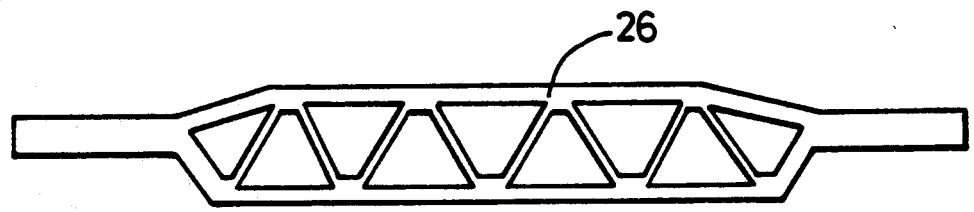
FIG. 6 is a medial section of the composite produced in Example (2) after superplastic forming.

Referring to FIGS. 4 to 6, three aluminium/lithium alloy plates were prepared as in Example (1), two of the plates, 21 and 22, being dimensioned 600 mm×600 mm×3 mm and the third plate 23 being 600 mm×600 mm×1 mm. Aluminium foil 24 as used in Example (1) was attached to an upper surface of the 1 mm thick plates 23 to form 5 stripes 50 mm wide by 290 mm long with spaces 13 mm wide therebetween, i.e. the stripes were spaced at 63 mm centres. An upper surface of one of the 3 mm thick plate 22 also had identical foil stripes 24 placed upon it, but only 4 in number, such that when the 1 mm thick plate 23 was placed above this 3 mm plate 22, a centre line of each of the four stripes 24 on the 3 mm plate 22 lay directly beneath the centre of the 4 spaces between the 5 stripes 24 of the superior 1 mm plate 23. The two plates, 22 and 23, were spaced to give a uniform gap of 1 mm between the upper "patterned" surface of the lower 3 mm plate 22 and the lower unpatterned surface of the 1 mm plate 23. The 3 mm plate 21 was placed over the other two plates, again with a uniform gap of 1 mm between, to make a three plate composite pack.

Following the procedure described in Example (1), the composite pack was placed on a granular salt bed on a 50 mm steel anvil and the upper surface of the pack was covered with granular salt. A 12 mm thick steel driver plate was placed above the composite pack assembly to give a uniform clearance gap of 15 mm between the driver plate and salt surface. An explosive layer was placed on the upper surface of the driver plate and this was detonated to bond the interfaces of the composite pack as in Example (1).

Ultrasonic examination showed that the plates 20, 21, 22 were bonded at the interfaces except for non-bonded areas 25 corresponding in profile exactly to the areas beneath the attached aluminium foil stripes 24.

The explosively bonded composite was further processed by annealing, solution heat treating and age hardening and was subsequently superplastically formed with a die by introducing gas into the cavities at the non-bonded areas 25 to form a 'Warren' girder test sample 26, shown in FIG. 6.

EXAMPLE 3

The surface of a 1000 mm×750 mm×13 mm steel plate 32 was ground to remove surface oxides. Stripes of aluminium foil 34 (as used in Example (1)), 6 mm wide, were aligned parallel to each other 50 mm apart to form a diagonal striped pattern over a surface of the plate 32. The surface of a similar sized high nickel alloy (Inconel 625) sheet 31, 3 mm thick, was similarly ground and this sheet 31 placed above the patterned surface of the steel plate 32 with the prepared surface underneath and adjacent to the nickel alloy surface. A uniform gap of 3 mm was arranged between these surfaces.

A layer of explosive was placed directly upon an upper surface of the Inconel sheet 31 and detonated in conventional manner from the centre of the longer side.

Ultrasonic examination of the bonded interface showed this to be bonded over the area with the exception of the areas between the steel 32 and aluminium foil 34 interface. This gave a diagonal pattern of unbonded paths to the edges of the resulting clad plate replicating exactly that of the original foil 34 patterned surface of the steel 32.

I claim:

1. A method of forming a composite laminar metal structure comprising the steps of:
    applying a layer of a metal foil and a layer of a stopping-off material to a first metal plate, said layers of said metal foil and said stopping-off material being in substantially a same shape;
    applying a second metal plate to said first metal plate whereby said layers of said metal foil and said stopping-off material are sandwiched between said first and second metal plates, said metal foil and stopping-off material being shaped so that an area free of said metal foil and said stopping-off material exists between said first and second metal plates; and
    impelling said first and second metal plates together by means of detonating an explosive charge whereby said first and second metal plates are metallurgically bonded together in said area free from said metal-foil and said stopping-off material and a first surface of said metal-foil free of said stopping-off material is metallurgically bonded to one of said first and second metal plates, said stopping-off material preventing a second surface of said metal-foil from bonding to one of said first and second metal plates, said metal foil being sufficiently thick to retain a profile and protect said stopping-off material from a scouring action of a jet during said impelling step and sufficiently thin to leave appropriate stand-off distance between said first surface of said metal foil and one of said first and second metal plates to ensure metallurgically bonding of said first surface of said metal foil to one of said first and second metal plates.

2. A method as claimed in claim 1, wherein said stopping-off material is an adhesive material whereby said metal foil is intimately affixed to one of said first and second plates.

3. A method as claimed in claim 2, wherein said adhesive material is provided as a backing on said metal foil as a preformed adhesive-backed metal foil.

4. A method as claimed in claim 1, wherein said metal foil and said stopping-off material comprise a tape.

5. A method as claimed in claim 1, wherein said stopping-off material and said metal foil comprise an adhesive backed aluminum foil.

6. A method as claimed in claim 1, wherein said metal plates comprise a metal selected from the group consisting of steel, aluminum, aluminum/lithium alloy and Ni alloy.

7. A method as claimed in claim 4, wherein said metal plates comprise a metal selected from the group consisting of steel, aluminum, aluminum/lithium alloy and Ni alloy.

8. A method of forming a hollow composite laminar metal structure, comprising the steps of:
    applying a layer of a metal foil and a layer of a stopping-off material to a first metal plate, said layers of said metal foil and said stopping-off material being in substantially a same shape;
    applying a second metal plate to said first metal plate whereby said layers of said metal foil and said stopping-off material are sandwiched between said first and second metal plates, said metal foil and stopping-off material are shaped so that an area free of said metal foil and said stopping-off material exists between said first and second metal plates;
    impelling said first and second metal plates together by means of detonating an explosive charge whereby said first and second metal plates are metallurgically bonded together in said area free from said metal-foil and said stopping-off material and a first surface of said metal-foil free of said stopping-off material is metallurgically bonded to one of said first and second metal plates to form a composite laminar metal structure, said stopping-off material preventing a second surface of said metal-foil from bonding to one of said first and second metal plates to form a non-bonded area, said metal foil being sufficiently thick to retain a profile and protect said stopping-off material from a scouring action of a jet during said impelling step and sufficiently thin to leave appropriate stand-off distance between said first surface of said metal foil and one of said first and second metal plates to ensure metallurgically bonding of said first surface of said metal foil to one of said first and second metal plates; and
    superplastically forming said hollow composite laminar metal structure in a die by introducing pressurized gas into said non-bonded area of said composite laminar metal structure.

* * * * *